United States Patent
Toyoda

(10) Patent No.: US 10,506,209 B2
(45) Date of Patent: Dec. 10, 2019

(54) IMAGE OUTPUT CONTROL DEVICE, IMAGE OUTPUT CONTROL METHOD, IMAGE OUTPUT SYSTEM, AND RECORDING MEDIUM

(71) Applicant: Kyocera Document Solutions Inc., Osaka (JP)

(72) Inventor: Takashi Toyoda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/155,963

(22) Filed: Oct. 10, 2018

(65) Prior Publication Data

US 2019/0110031 A1  Apr. 11, 2019

(30) Foreign Application Priority Data

Oct. 10, 2017 (JP) .................................. 2017-197282

(51) Int. Cl.
H04N 9/31 (2006.01)
H04N 5/235 (2006.01)
H04N 5/238 (2006.01)
H04N 5/243 (2006.01)

(52) U.S. Cl.
CPC ......... H04N 9/3182 (2013.01); H04N 9/3194 (2013.01); *H04N 5/238* (2013.01); *H04N 5/2353* (2013.01); *H04N 5/243* (2013.01)

(58) Field of Classification Search
CPC ... H04N 9/3182; H04N 9/3194; H04N 5/2353
See application file for complete search history.

(56) References Cited

U.S. PATENT DOCUMENTS

2006/0170995 A1* 8/2006 Ariga ....................... H04N 1/60
 358/518
2009/0190046 A1* 7/2009 Kreiner ................ H04N 9/3182
 348/789

FOREIGN PATENT DOCUMENTS

JP 2011-015738 A 1/2011

* cited by examiner

*Primary Examiner* — Michael E Teitelbaum
(74) *Attorney, Agent, or Firm* — James Judge

(57) ABSTRACT

An image output control device controls an image output device that outputs an image. The image output control device performs an adjustment to make an output image close to a reference image of a reference image display apparatus preliminarily set. The image output control device includes a capturing unit and an image adjustment unit. The capturing unit captures the output image to generate output image data. The image adjustment unit calculates an adjustment amount for making the output image close to the reference image using the output image data to adjust image data using the calculated adjustment amount.

9 Claims, 5 Drawing Sheets

IMAGE OUTPUT CONTROL DEVICE, IMAGE OUTPUT CONTROL METHOD, IMAGE OUTPUT SYSTEM, AND RECORDING MEDIUM

INCORPORATION BY REFERENCE

This application is based upon, and claims the benefit of priority from, corresponding Japanese Patent Application No. 2017-197282 filed in the Japanese Patent Office on Oct. 10, 2017, and the entire contents of which are incorporated herein by reference.

BACKGROUND

Unless otherwise indicated herein, the description in this section is not prior art to the claims in this application and is not admitted to be prior art by inclusion in this section.

Color management systems that uniformly manage colors among a plurality of different devices such as digital cameras, scanners, monitors, and printers are prevalent. However, the appearance of an image to a human's visual senses varies depending not only on a device's properties, but also on the surrounding environment. For such a problem, the following technique has been proposed. In this technique, an image process is performed using an image process parameter corresponding to information regarding a surrounding environment where a printed image is observed, and a video signal obtained by performing the image process is output to a printer. In this technique, as an observation environment (a surrounding environment where the observation is performed) of a printed matter, three-phased brightness levels specified by CIECAM, that is, a brightness in a dark room where an image is displayed using a projector (dark environment: Dark), a brightness in a room in television watching (dim environment: Dim), and a brightness to the extent that a color of an object can be confirmed (average environment: Average) are assumed.

SUMMARY

An image output control device according to one aspect of the disclosure controls an image output device that outputs an image. The image output control device performs an adjustment to make an output image close to a reference image of a reference image display apparatus preliminarily set. The image output control device includes a capturing unit and an image adjustment unit. The capturing unit captures the output image to generate output image data. The image adjustment unit calculates an adjustment amount for making the output image close to the reference image using the output image data to adjust image data using the calculated adjustment amount.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
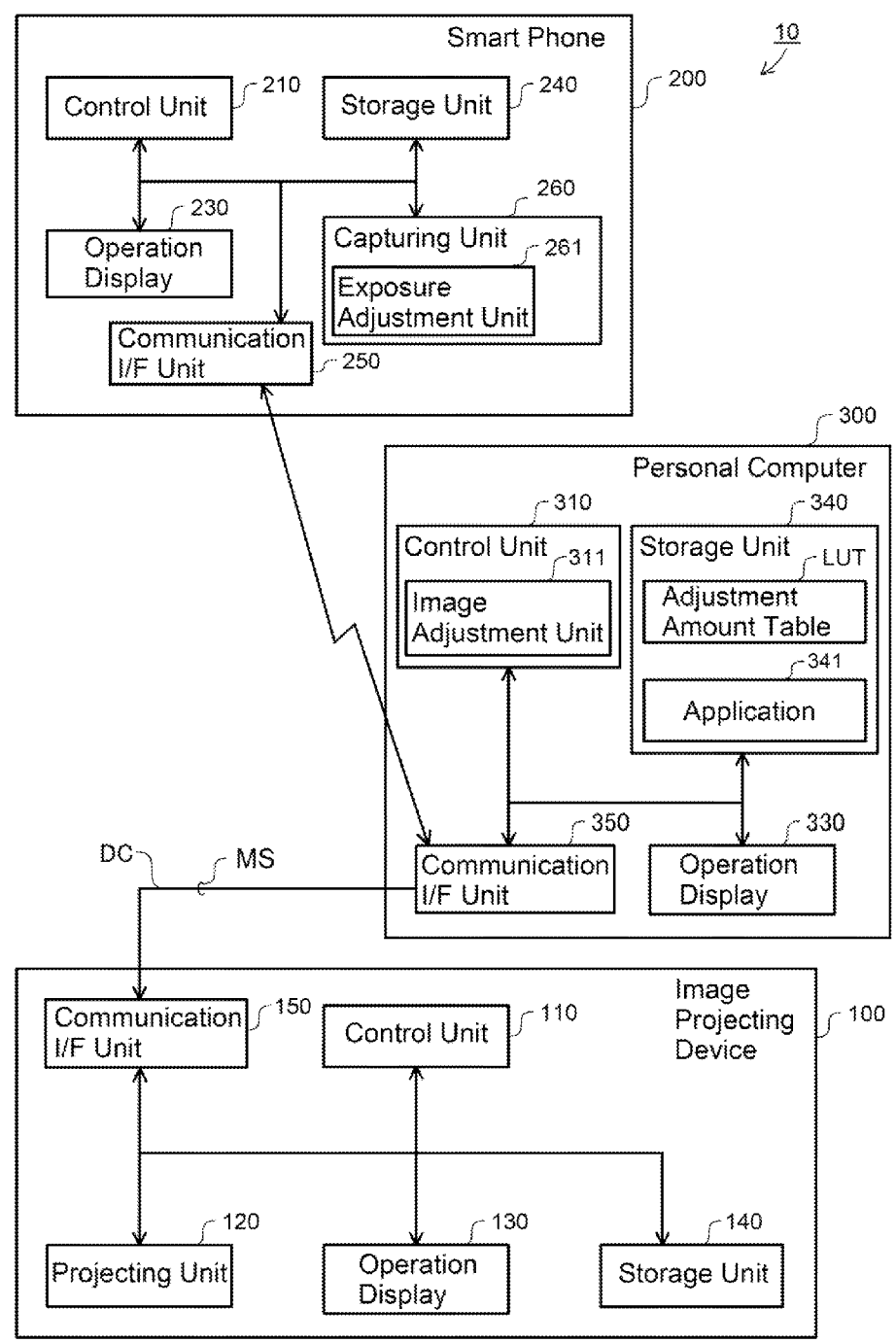
FIG. 1 illustrates a block diagram illustrating a functional configuration of an image projection system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

FIG. 1 illustrates a block diagram illustrating a functional configuration of an image projection system 10 according to one embodiment of the disclosure. The image projection system 10, which is also referred to as an image output system, includes an image projecting device 100, a smart phone 200, and a personal computer 300. The image projecting device 100, which is also referred to as an image output device, includes a control unit 110, a projecting unit 120, an operation display 130, a storage unit 140, and a communication interface unit (also referred to as a communication I/F unit) 150. A combination of the smart phone 200 and the personal computer 300 is also referred to as an image output control device.

The smart phone 200 includes a control unit 210, an operation display 230, a storage unit 240, a communication interface unit 250, and a capturing unit 260. The personal computer 300, which is a portable notebook-type computer, includes a control unit 310, an operation display 330, a storage unit 340, and a communication interface unit 350. The control unit 310 includes an image adjustment unit 311. The image adjustment unit 311 has a function described later.

The capturing unit 260 includes an exposure adjustment unit 261. The exposure adjustment unit 261 can operate a shutter speed, an aperture value, and an ISO sensitivity to adjust an exposure, corresponding to a light amount of a capturing object. The shutter speed is a time (an exposure time) when a capturing element is exposed to a light through an optical system. The aperture value is an adjustment amount of an amount of the light through the optical system, and can be expressed in an $f$-value. The ISO sensitivity matches an amplification factor of an electrical signal output from the capturing element.

The smart phone 200 and the personal computer 300 are mutually connected in a short-range wireless communication using the communication interface units 250 and 350. In this embodiment, the short-range wireless communication uses Bluetooth™ CLASS2. Bluetooth™ CLASS2 is a communication with an output of 2.5 W, and a short-range wireless communication that ensures a communication where a distance between the image projecting device 100 and the smart phone 200 is within about 10 m.

The image projecting device 100 is connected to the personal computer 300 by wire via a display cable DC. The image projecting device 100 projects an image based on a video signal MS transmitted from the personal computer 300.

The operation display 130 of the image projecting device 100 and the operation display 230 of the smart phone 200 function as touch panels, display various menus as input screens, and accept operation inputs from users. The operation display 330 of the personal computer 300 includes a liquid crystal display, a keyboard, and a computer mouse (not illustrated).

The control units 110, 210, and 310 include main storage units such as RAMs and ROMs, and control units such as micro-processing units (MPUs) and central processing units (CPUs). The control unit 110 has a controller function related to an interface such as various I/Os, a universal serial bus (USB), a bus, and other hardware. The control units 110, 210, and 310 control whole of the image projecting device 100, the smart phone 200, and the personal computer 300 respectively.

The storage units 140, 240, and 340, which are storage devices formed of, for example, hard disk drives and flash memories as non-transitory recording media, store control programs and data of processes executed by the control units 110, 210, and 310 respectively. The storage unit 340 stores an image adjustment application program 341 (also referred to as an image output control program or an application), which will be installed in the smart phone 200, and an adjustment amount table LUT. The adjustment amount table LUT will be described later in detail.

In this example, it is considered that the smart phone 200 has already downloaded the image adjustment application program 341 from the storage unit 340 of the personal computer 300, and installed the image adjustment application program 341 in the storage unit 240.

Figure 2:
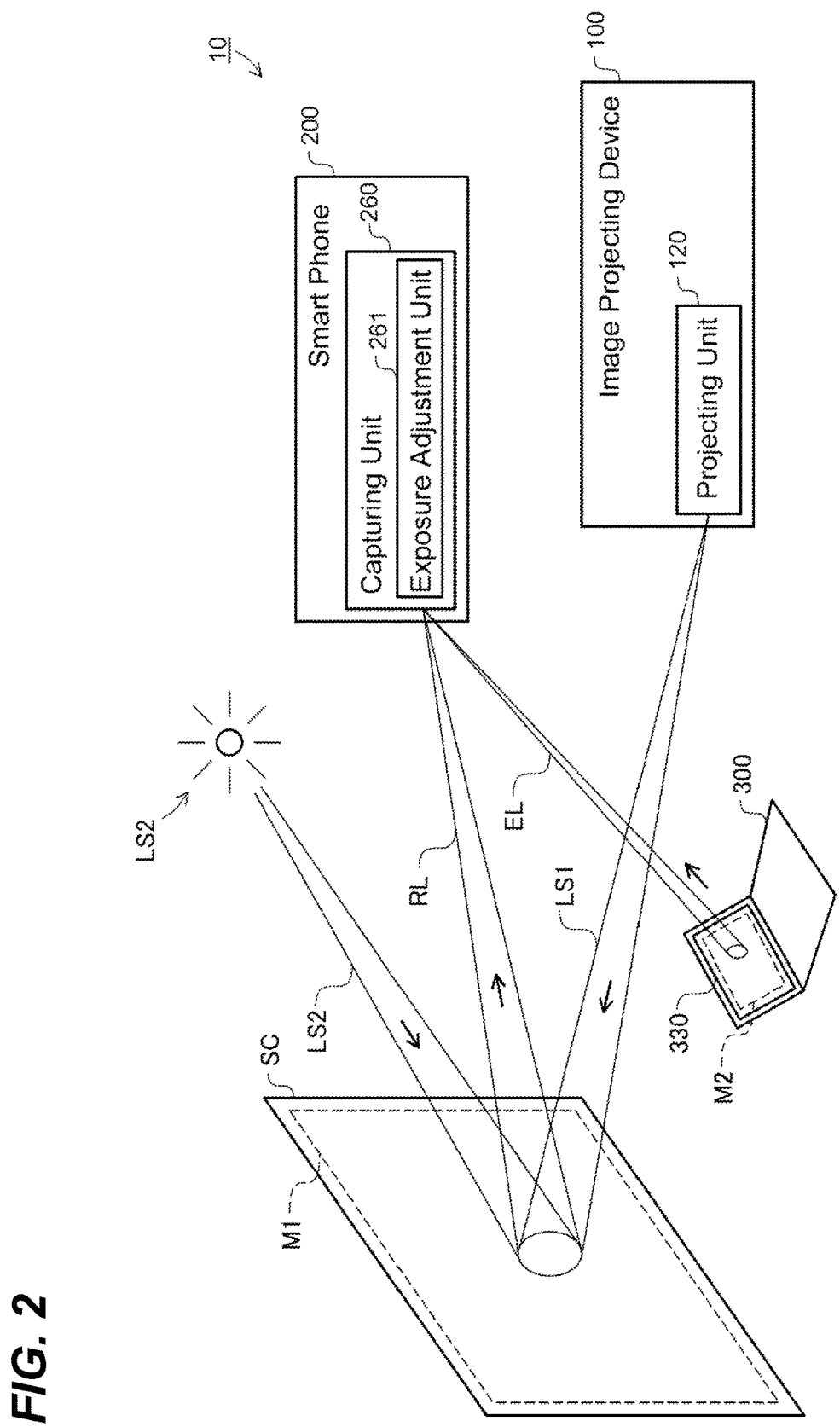
FIG. 2 illustrates a state of a projection image adjustment process in the image projection system according to the one embodiment.

FIG. 2 illustrates a state of a projection image adjustment process in the image projection system 10 according to the one embodiment. In this example, the user is preparing a presentation using the image projection system 10 and a screen SC (also referred to as a projected surface). It is considered that the image projection system 10 is used under an environment light LS2 emitted from a fluorescent lamp (not illustrated) or similar lamp.

The personal computer 300 displays a self-luminous image M2 on the liquid crystal display of the operation display 330. The self-luminous image M2 is an image displayed with a self-luminescence based on adjustment image data. The personal computer 300 is also referred to as a reference image display apparatus. Meanwhile, the image projecting device 100 projects a projection image M1 on the screen SC with a projection light LS1. The projection image M1 is displayed based on the video signal MS input from the personal computer 300 via the display cable DC. The video signal MS is a video signal generated based on adjustment image data identical to that of the self-luminous image M2.

Thus, the projection image M1 and the self-luminous image M2 are the images displayed based on the identical adjustment image data. However, the projection image M1 and the self-luminous image M2 are generally different images for the following two reasons.

The first reason is a difference in image display methods of the projection image M1 and the self-luminous image M2. For the projection image M1, a video is displayed as a reflected light from the screen SC. Accordingly, the screen SC is sensed by a human as a video (the projection image M1) synthesized from a reflected light of the environment light LS2 and a reflected light of the projection light LS1 from the image projecting device 100. Accordingly, the projection image M1 has a luminance and a chromaticity that change corresponding to the environment light LS2.

Specifically, the projection image M1 has a contrast ratio decreased by the environment light LS2. The contrast ratio is a ratio of a brightness (luminance) of the brightest white to a brightness (luminance) of the darkest black in the image. This is because the environment light LS2 brightens the darkest black in the projection image M1. The contrast ratio represents a magnitude of a dynamic range as a range of the brightness from the brightest white to the darkest black in the image, and visually sensed as a contrast of the image.

Meanwhile, the self-luminous image M2 is displayed on the liquid crystal display of the operation display 330. The operation display 330 displays the video with the self-luminescence. Thus, the self-luminous image M2 has a property that is insusceptible to the environment light LS2 compared with the projection image M1.

The second reason is a difference in other image adjustment set contents including device characteristics and color temperatures of the projecting unit 120 of the image projecting device 100 and the operation display 330 of the personal computer 300. There is a problem that since the image projecting device 100 is a device in a visit destination, the user is unfamiliar to its adjustment method, and the adjustment is not necessarily permitted.

Figure 3:
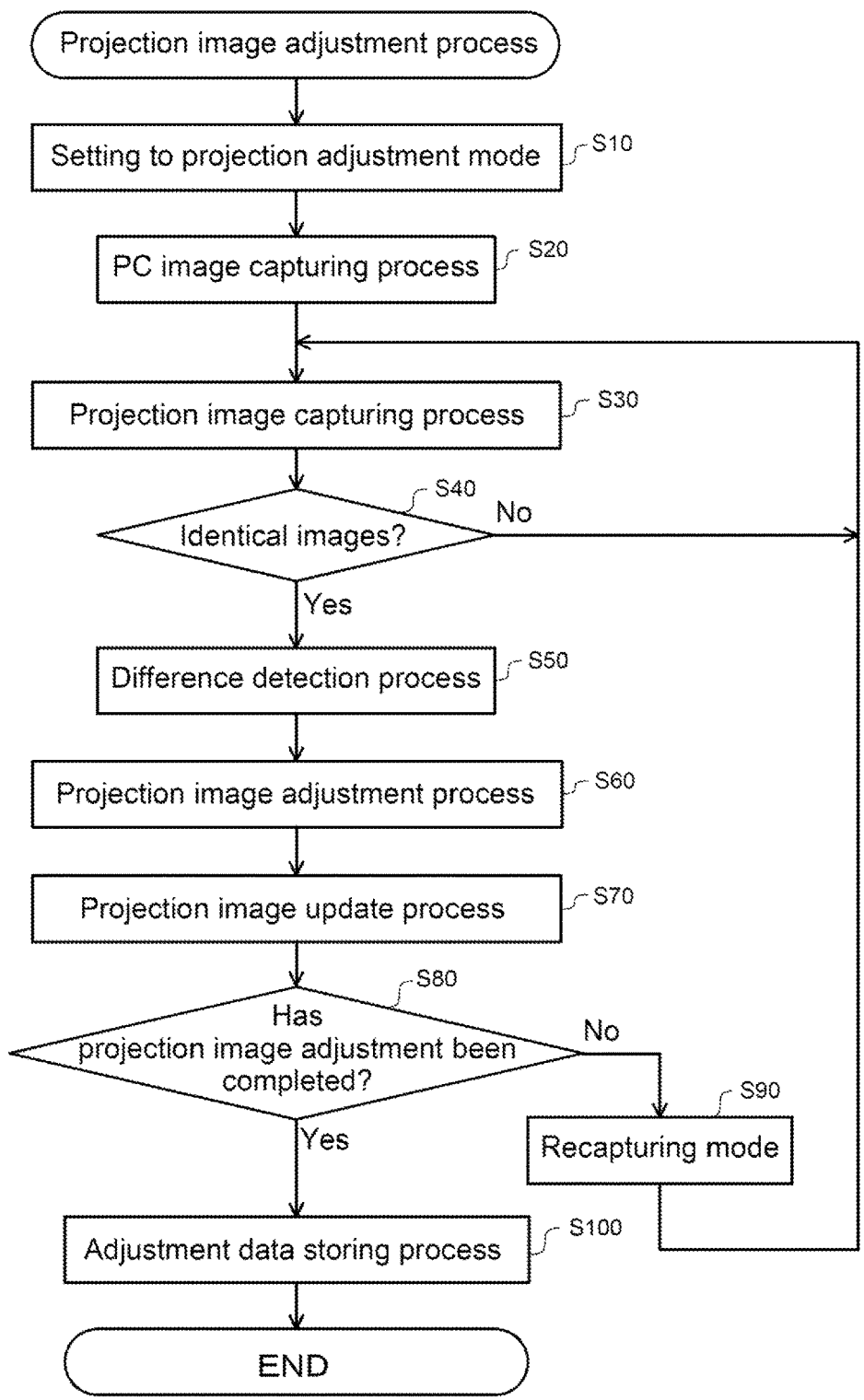
FIG. 3 illustrates a content of the projection image adjustment process according to the one embodiment.

FIG. 3 illustrates a content of the projection image adjustment process according to the one embodiment. The projection image adjustment process is a process to image the projection image M1 and the self-luminous image M2 with the smart phone 200 to compare them, thus making the projection image M1 close to the self-luminous image M2.

In this example, it is considered that the user brings the smart phone 200 and the personal computer 300 to the visit destination to make a presentation using the image projecting device 100 in the visit destination. It is considered that an image quality such as a color shade and a contrast of a presentation material has been preliminarily adjusted using the operation display 330 of the personal computer 300.

At Step S10, the user activates the respective image adjustment application programs 341 of the smart phone 200 and the personal computer 300 to set an operation mode of the smart phone 200 to a projection adjustment mode. The smart phone 200 is automatically connected to the personal computer 300 in a wireless communication. This makes the personal computer 300 cause the operation display 330 to display an adjustment test pattern (not illustrated) as a reference image MR using the adjustment image data. The image adjustment application program 341 has the adjustment image data.

At Step S20, the user executes a PC image capturing process. In the PC image capturing process, the user captures an image by receiving an emission of light EL as a test pattern (the self-luminous image M2) displayed on the operation display 330 using the capturing unit 260 of the smart phone 200. In the capturing, the capturing unit 260 adjusts the exposure using the exposure adjustment unit 261.

This makes the smart phone 200 generate reference image data representing image data that will be a reference image. The reference image data is raw image data (in raw image format). The raw image data is image data before an execution of a raw development process. The raw image data is transmitted to the personal computer 300 without the raw development process.

The raw development process includes a process to approximate an image in the natural world to a process executed by a visual system of the human being. This makes the smart phone 200 make an image display of a capturing object close to an image detected by a sense of vision of the human. The raw development process includes an adjustment process such as an exposure adjustment (a fine adjustment), a white balance, and a contrast adjustment. That is, the raw image data is data physically representing a display state of the operation display 330, while image data (for example, JPEG data) after the raw development process is data on which an adjustment process is performed so as not to visually provide an uncomfortable feeling.

At Step S30, the user executes a projection image capturing process. In the projection image capturing process, the user captures an image by receiving a reflected light RL of a test pattern (the projection image M1) projected on the screen SC using the capturing unit 260 of the smart phone 200. The test pattern (the projection image M1) is an image projected by the image projecting device 100 using the adjustment image data.

This makes the smart phone 200 generate projection image data representing the projection image to transmit it to the personal computer 300. The projection image data is transmitted to the personal computer 300 as the raw image data without the raw development process. The projection image data is also referred to as output image data.

At Step S40, the image adjustment unit 311 of the control unit 310 executes a pattern matching analysis process between the projection image M1 and the self-luminous image M2 to determine whether the projection image M1 and the self-luminous image M2 are identical images or not. When it is determined that the projection image M1 and the self-luminous image M2 are not the identical images, the smart phone 200 displays a screen (not illustrated) that notifies the operation display 230 that the images do not match to return the process to Step S30. When it is determined that the projection image M1 and the self-luminous image M2 are the identical images, the smart phone 200 advances the process to Step S50.

At Step S50, the image adjustment unit 311 executes a difference detection process. In the difference detection process, the image adjustment unit 311 converts the reference image data and the projection image data as the raw image data into the reference image MR and a before-adjustment projection image MT1 as Lab color space data respectively.

The image adjustment unit 311 further resolves the reference image MR and the before-adjustment projection image MT1 into a plurality of blocks. The plurality of blocks are blocked as each corresponding between the reference image MR and the before-adjustment projection image MT1, using a pattern matching process or similar process. It is considered that the block has a size whose initial value is preliminarily set as, for example, 10 pixels (a vertical direction)×15 pixels (a lateral direction). The block size has a minimum value that is 1 pixel (the vertical direction)×1 pixel (the lateral direction).

Figure 4:
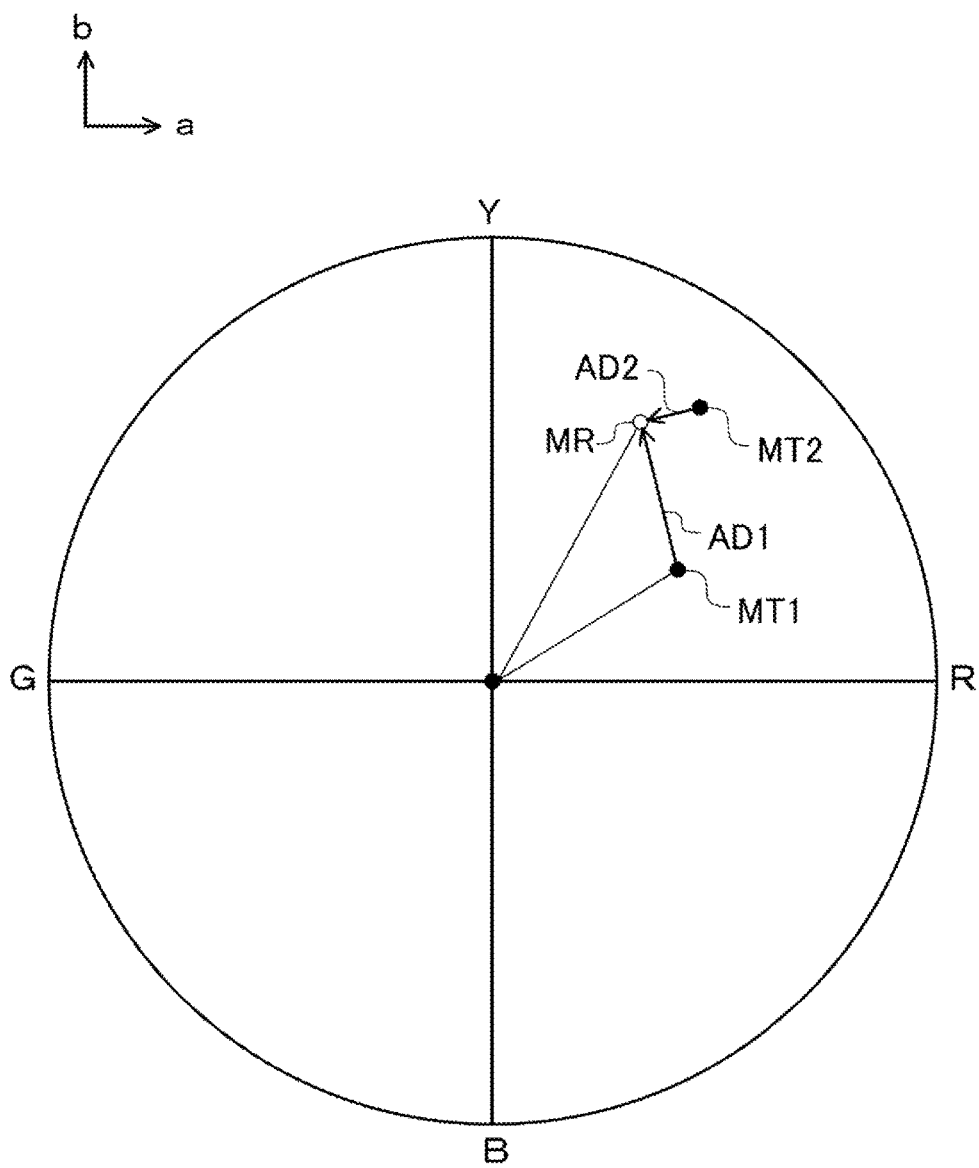
FIG. 4 illustrates a content of the projection image adjustment process according to the one embodiment in a Lab color space.

FIG. 4 illustrates a content of the projection image adjustment process according to the one embodiment in the Lab color space. The Lab color space has a dimension L, which means the luminance, and complementary color dimensions (chromaticities) a and b, and is perceptually uniform. To be "perceptually uniform" means that, when values of the chromaticity equally change, changes sensed by the human when seeing them are also equal. In the Lab color space, an a+ side is red (R), an a− side is green (G), a b+ side is yellow (Y), and a b− side is blue (B). A point where an a-axis is perpendicular to a b-axis is achromatic.

The image adjustment unit 311 calculates average values of the dimension L and the complementary color dimensions (the chromaticities) a and b for each block. The image adjustment unit 311 calculates respective differences between the average values of the reference image MR and the average values of the before-adjustment projection image MT1 at the dimension L, the complementary color dimension a, and the complementary color dimension b for each block.

At Step S60, the image adjustment unit 311 executes the projection image adjustment process based on the calculated difference. In the projection image adjustment process, the image adjustment unit 311 calculates a chromaticity adjustment amount AD and a luminance adjustment amount LAD for making the before-adjustment projection image MT1 close to the reference image MR. The chromaticity adjustment amount AD is calculated for each block included in the test pattern. FIG. 4 exemplifies one of a plurality of blocks included in the test pattern.

That is, the image adjustment unit 311 uses a chromaticity (also referred to as a first chromaticity) of the reference image MR and a chromaticity (also referred to as a second chromaticity) of the before-adjustment projection image MT1 to calculate a chromaticity adjustment amount AD1 for making the second chromaticity close to the first chromaticity as a part of the adjustment amount.

A luminance adjustment amount LAD1 is, for example, an adjustment amount for making a contrast ratio of the before-adjustment projection image MT1 close to a contrast ratio of the reference image MR. The luminance adjustment amount LAD1 is an adjustment amount for adjusting the before-adjustment projection image MT1 so as to make ratios of the maximum luminances to the minimum luminances be close in the test patterns in the before-adjustment projection image MT1 and the reference image MR.

That is, the image adjustment unit 311 uses a luminance component L1 (also referred to as a first luminance component) of the reference image MR and a luminance component L2 (also referred to as a second luminance component) of the before-adjustment projection image MT1 to calculate the luminance adjustment amount LAD1 for making a contrast ratio of the second luminance component L2 close to a contrast ratio of the first luminance component L1 as a part of the adjustment amount.

The chromaticity adjustment amount AD1 and the luminance adjustment amount LAD1 can be generated, for example, as the adjustment amount table LUT. The adjustment amount table LUT has a look-up table of the chromaticity adjustment amount AD1 and a look-up table of the luminance adjustment amount LAD1.

At Step S70, the image adjustment unit 311 executes a projection image update process. In the projection image update process, the image adjustment unit 311, using the adjustment amount table LUT, executes processes such as an interpolation and an extrapolation as necessary to adjust the luminance and the chromaticity of the adjustment image data in the Lab color space, and converts the adjustment image data after the adjustment into RGB image data to project it. This can make the image projection system 10 display an after-adjustment projection image MT2 on the screen SC.

Figure 5:
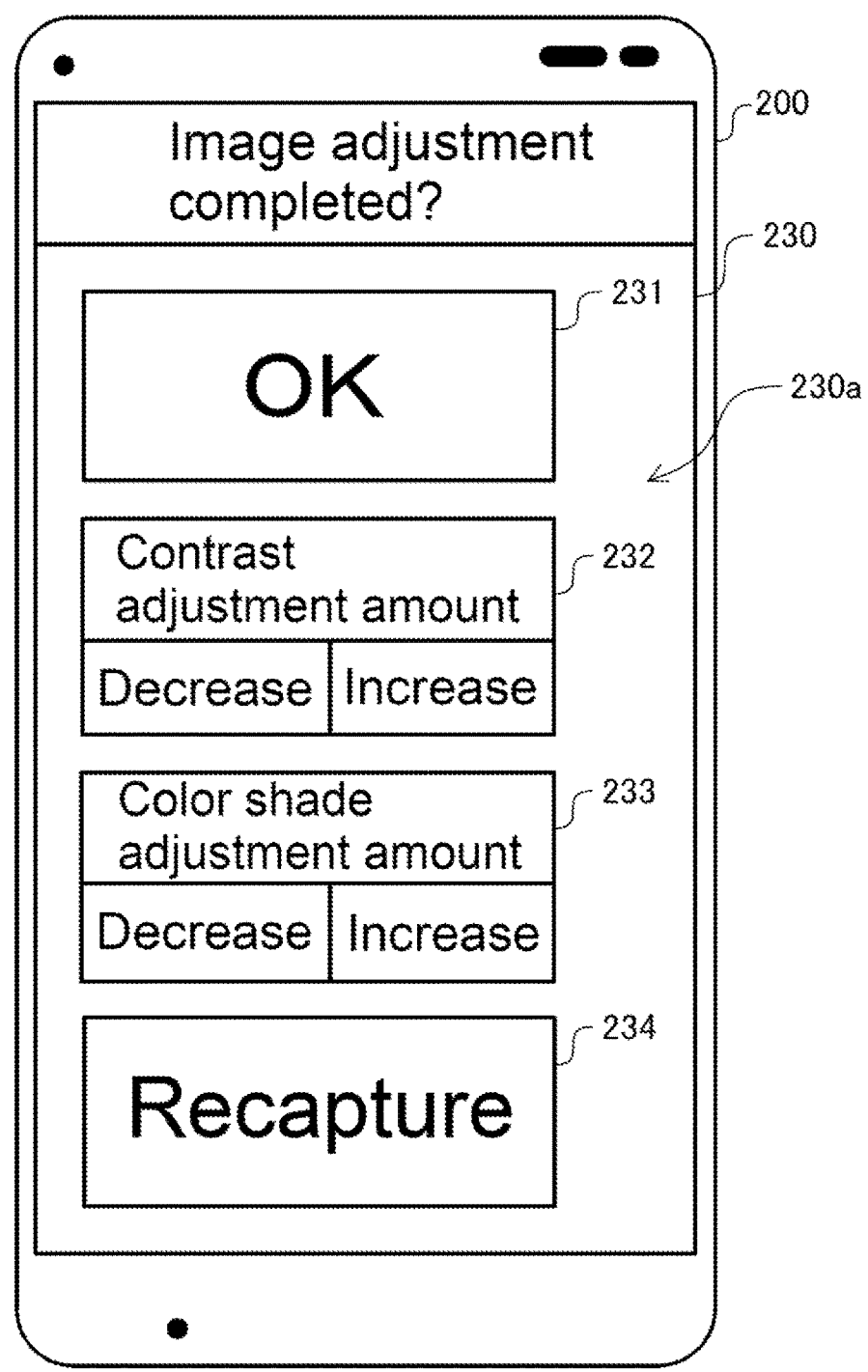
FIG. 5 illustrates an operation display screen that prompts a confirmation of a projection image adjusted by the projection image adjustment process according to the one embodiment.

FIG. 5 illustrates an operation display screen 230a that prompts a confirmation of the projection image adjusted by the projection image adjustment process according to the one embodiment. This operation display screen 230a is automatically displayed on the operation display 230 of the smart phone 200 corresponding to a completion of the projection image update process.

At Step S80, the image adjustment unit 311 inquires of the user whether the adjustment of the projection image has completed or not via the operation display screen 230a. When the user determines that an appearance of the after-adjustment projection image MT2 is sufficiently close to the reference image MR, the user touches an OK icon 231 in the operation display screen 230a. When the user determines to wish to make the appearance of the after-adjustment projection image MT2 further close to the reference image MR, the user touches any of a contrast adjustment amount icon 232, a color-shade adjustment amount icon 233, and a recapturing icon 234.

The contrast adjustment amount icon 232 can change the projection image in real-time by linearly decreasing the luminance adjustment amount LAD1 with a touch in a "Decrease" region, and by linearly increasing the luminance adjustment amount LAD1 with a touch in an "Increase" region. The color-shade adjustment amount icon 233 can change the projection image in real-time by linearly decreasing the chromaticity adjustment amount AD1 with a touch in a "Decrease" region, and by linearly increasing the chromaticity adjustment amount AD1 with a touch in an "Increase" region.

When the user touches the OK icon 231 to input a fact that the adjustment has completed to the operation display 230, the image adjustment unit 311 advances the process to Step S100. When the user touches the recapturing icon 234 to input a fact to request a readjustment to the operation display 230, the image adjustment unit 311 advances the process to Step S90.

At Step S90, the image adjustment unit 311 switches a process mode of the personal computer 300 to a recapturing mode. In the recapturing mode, the user executes the projection image capturing process. In the projection image capturing process, the user captures the after-adjustment projection image MT2 projected on the screen SC using the capturing unit 260 of the smart phone 200, and confirms an identity of the images (Steps S30 and S40).

At Step S50, the image adjustment unit 311 calculates differences of the dimensions L, the complementary color dimensions a, and the complementary color dimensions b of the reference image MR and the after-adjustment projection image MT2 for each block in the Lab color space. At Step S60, the image adjustment unit 311 calculates a chromaticity adjustment amount AD2 and a luminance adjustment amount LAD2 (see FIG. 4), and uses the calculated chromaticity adjustment amount AD2 and luminance adjustment amount LAD2 to correct the adjustment amount table LUT, for example, by an addition process of the chromaticity adjustment amount AD1 and the luminance adjustment amount LAD1. At Step S70, the image adjustment unit 311 executes the projection image update process using the corrected adjustment amount table LUT.

After the user repeats such processes (Steps S30 to S90) as necessary, when the user determines that an appearance of an after-adjustment projection image (for example, the after-adjustment projection image MT2) is sufficiently close to the reference image MR, the user touches the OK icon 231 in the operation display screen 230a to advance the process to Step S100.

At Step S100, the image adjustment unit 311 executes an adjustment data storing process. In the adjustment data storing process, the image adjustment unit 311 stores the adjustment amount table LUT in the storage unit 340. This can make the personal computer 300 generate the video signal MS based on the image data adjusted using the adjustment amount table LUT to reproduce the projection image with a color close to that of the reference image MR.

Thus, the image projection system 10 according to the embodiment can adjust the projection image with a simple method to match an image quality of the projection image to that of the display image in the operation display 330 of the personal computer 300. In this respect, the adjustment is performed on a side of the personal computer 300. Thus, it is not necessary to use an adjustment function of the image projecting device 100.

The disclosure can be implemented in the following modifications not only the above-described embodiment.

Modification 1

In the above-described embodiment, the smart phone is used. However, the disclosure is applicable to a portable terminal such as a tablet insofar as the capturing is ensured.

Modification 2

In the above-described embodiment, the image adjustment unit performs the adjustment by generating the adjustment amount table as the look-up table. However, it is not necessarily to use the look-up table. The adjustment may be performed by an adjustment of coefficients of a transformation matrix and a new generation of an adjustment transformation matrix.

Modification 3

In the above-described embodiment, the disclosure is embodied as the image projection system 10 including the image projecting device 100 and the image output control devices (the smart phone 200 and the personal computer 300). However, the smart phone 200 is not necessarily required.

Specifically, the disclosure may be configured as, for example, an image output control device where the personal computer 300 includes a capturing unit to store proofing data, and the personal computer 300 alone adjusts an image of an image projecting device. The proofing data includes, for example, reference image data generated by preliminarily capturing the self-luminous image M2 displayed on the liquid crystal display of the operation display 330. Similarly, the disclosure may be configured as an image output control device where the smart phone 200 outputs the video signal MS.

Modification 4

In the above-described embodiment, the adjustment is performed using the preliminarily prepared adjustment image data. However, the adjustment image data is not necessarily required. For example, the adjustment may be performed using a plurality of images that will be projected. The adjustment may be performed using image data representing one of the plurality of images as the adjustment image data (sample), an average value of all the adjustment amounts of the plurality of images may be used, a plurality of adjusting values may be obtained by associating with the respective plurality of images, or an adjusting value for an especially important image among the plurality of images may be differentially obtained.

Modification 5

In the above-described embodiment, the disclosure is applied to the projection of the image. However, the disclosure is also applicable to an image formation process. Specifically, the disclosure, for example, can image a printed matter with a capturing unit to match the image of the printed matter to a reference image. This is because the printed matter displays an output image with a reflection of the environment light. The disclosure can generally image the output image that is susceptible to the environment light with the capturing unit to match the output image to the reference image.

Exemplary Embodiment of the Disclosure

The disclosure provides an image output control device that controls an image output device that outputs an image. The image output control device performs an adjustment to make an output image close to a reference image of a reference image display apparatus preliminarily set. The image output control device includes a capturing unit that images the output image to generate output image data, and an image adjustment unit that calculates an adjustment amount for making the output image close to the reference image using the output image data. The image adjustment unit adjusts image data using the calculated adjustment amount.

An image output system of the disclosure includes the image output control device, and an image output device that outputs the image.

The disclosure provides an image output control method that controls an image output device that outputs an image. The image output control method performs an adjustment to make an output image close to a reference image of a reference image display apparatus preliminarily set. The image output control method includes a capturing step of capturing the output image to generate output image data, and an image adjusting step of calculating an adjustment amount for making the output image close to the reference image using the output image data to adjust image data using the calculated adjustment amount.

The disclosure provides an image output control program to control an image output control device that controls an image output device that outputs an image. The image output control device performs an adjustment to make an output image close to a reference image of a reference image display apparatus preliminarily set. The image output control program causes the image output control device to function as a capturing unit that images the output image to generate output image data, and an image adjustment unit that calculates an adjustment amount for making the output image close to the reference image using the output image data. The image adjustment unit adjusts image data using the calculated adjustment amount.

Effect of the Disclosure

The disclosure can adjust the output image with a simple method.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image output control device that controls an image output device that outputs an image, the image output control device performing an adjustment to make an output image close to a reference image of a reference image display apparatus preliminarily set, the image output control device comprising:
   a capturing unit that captures the output image to generate output image data; and
   a processor that calculates an adjustment amount for making the output image close to the reference image using the output image data to adjust image data using the calculated adjustment amount; wherein
   the processor uses a first luminance component of the reference image and a second luminance component of the output image to calculate a luminance adjustment amount for making a contrast ratio of the second luminance component close to a contrast ratio of the first luminance component as at least a part of the adjustment amount.

2. The image output control device according to claim 1, wherein the processor converts reference image data as image data representing the reference image and the output image data into respective image data in a Lab color space, calculates a difference between the reference image and the output image in the Lab color space, and calculates the adjustment amount using the calculated difference.

3. The image output control device according to claim 2, wherein the processor executes the adjustment in the Lab color space using the adjustment amount.

4. The image output control device according to claim 1, wherein the processor uses a first chromaticity of the reference image and a second chromaticity of the output image to calculate a chromaticity adjustment amount for making the second chromaticity close to the first chromaticity as at least a part of the adjustment amount.

5. The image output control device according to claim 1, wherein the capturing unit captures the reference image displayed on the reference image display apparatus to generate the reference image data representing the reference image.

6. The image output control device according to claim 1, wherein:
   the image output device is an image projecting device that projects the image on a projected surface; and
   the capturing unit captures a projection image projected on the projected surface to generate projection image data as the output image data.

7. An image output system comprising:
   the image output control device according to claim 1; and
   the image output device that outputs the image.

8. An image output control method that controls an image output device that outputs an image, the image output control method performing an adjustment to make an output image close to a reference image of a reference image display apparatus preliminarily set, the image output control method comprising:
   capturing the output image to generate output image data;
   calculating an adjustment amount for making the output image close to the reference image using the output image data to adjust image data using the calculated adjustment amount; and
   using a first luminance component of the reference image and a second luminance component of the output image to calculate a luminance adjustment amount for making a contrast ratio of the second luminance component close to a contrast ratio of the first luminance component as at least a part of the adjustment amount.

9. A non-transitory computer-readable recording medium storing an image output control program to control, as an image output control device, at least a personal computer, the image output control device controlling an image output device that outputs an image, and performing an adjustment to make an output image close to a reference image of a reference image display apparatus preliminarily set, the image output control program causing a processor in the image output control device to function as:

a capturing unit that captures the output image to generate output image data; and image adjustment unit that calculates an adjustment amount for making the output image close to the reference image using the output image data to adjust image data using the calculated adjustment amount; wherein the image adjustment unit uses a first luminance component of the reference image and a second luminance component of the output image to calculate a luminance adjustment amount for making a contrast ratio of the second luminance component close to a contrast ratio of the first luminance component as at least a part of the adjustment amount.

* * * * *